July 7, 1936. D. M. McCAIN 2,046,571
IDENTIFYING METALLIC PLATE AND MEANS FOR ATTACHING THE SAME
Filed March 16, 1935
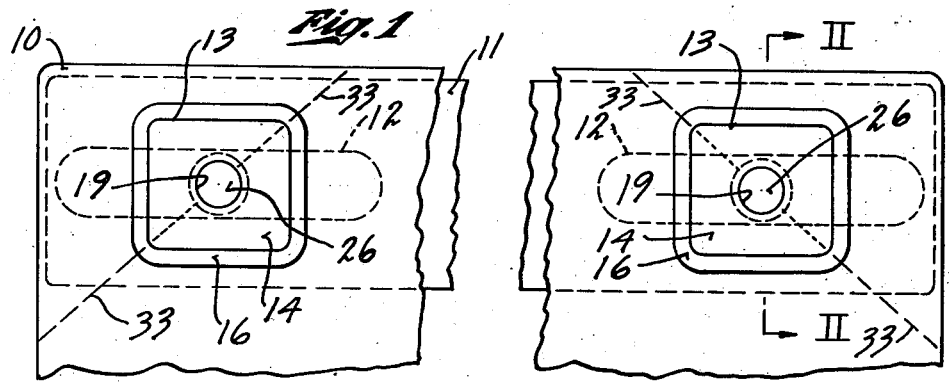
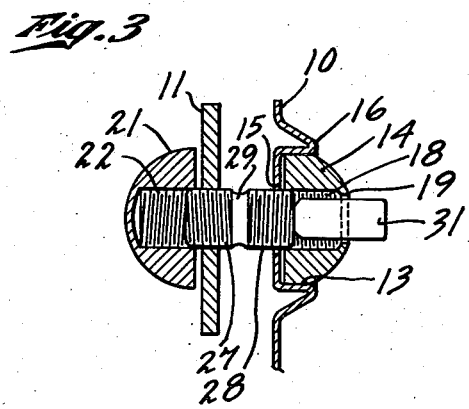
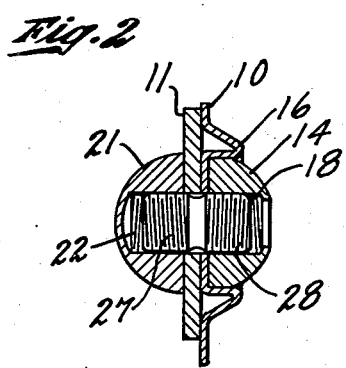
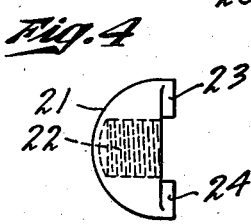
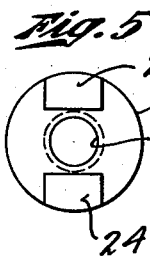
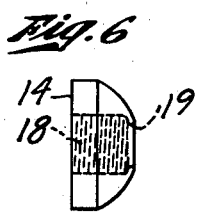
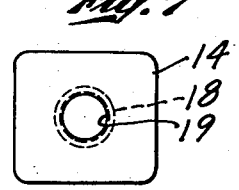
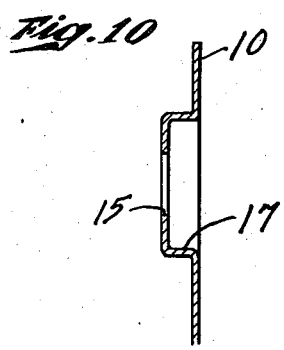
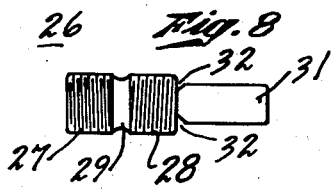
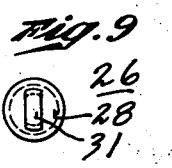
INVENTOR
D. M. McCain
BY Johnston & Jennings
ATTORNEYS Patented July 7, 1936

2,046,571

UNITED STATES PATENT OFFICE 2,046,571

IDENTIFYING METALLIC PLATE AND MEANS FOR ATTACHING THE SAME

Dewey M. McCain, Starkville, Miss.

Application March 16, 1935, Serial No. 11,403

8 Claims. (Cl. 40—125)

My invention relates to means for fastening identifying metallic plates to relatively fixed objects, and has particular reference to a means for securing motor vehicle license plates to the bracket ordinarily provided on such vehicles, and has for its object to provide a fastening means of such a character that the identifying data can not be removed without mutilating or destroying the metallic plate bearing it.

Another object of my invention is to provide a metallic plate and fastening means therefor adapted to cooperate with a fixed bracket having an elongated slot therein through which the fastening means is passed, and a fastening means cooperating with the fixed bracket and the metallic plate whereby when once installed, the plate can not be removed without destroying it.

A still further object of my invention is to provide a fastening means for metallic plates, which fastening means shall be in the form of a bolt provided with right and left hand threads, and nuts having recesses therein with cooperating threads, and the bolt provided with a head adapted to be twisted off when the nuts are screwed home, leaving the bolt inaccessible for turning within the recesses of the nuts.

As is well known, the stealing and exchanging of automobile license plates by petty thieves and criminals is a serious problem in the detection and apprehension of those committing crimes. It is quite common for criminals who are fleeing from their pursuers to exchange their automobile license plates with those of some innocent owner, and proceed safely past officers of the law who may be looking out for a car bearing a certain license plate number which had already been identified. Also the borrowing and temporary exchange of license plates in order to evade the license plate tax has become so common in some states that the use of license plates at the front and rear of the vehicle has been abolished and only one plate is now employed. By the use of my invention, it will be impossible for such an exchange to take place, for the reason that it would be necessary to so mutilate a license plate in removing it that it could not again be used.

Briefly, my invention comprises a license plate or the like which is provided with a plurality of recesses on its front side, or the side bearing the identifying data, the recesses each having a bolt hole through its center and the walls of each of the recesses being adapted to bear against the sides of the nut and hold it against rotation. A second nut is provided for each of the bolts on the rear of the bracket ordinarily provided on the motor vehicle, and is provided with lugs which fit into the elongated recess in the bracket, which lugs hold the second nut against turning.

A bolt having right and left hand threads on its opposite ends is adapted to screw into the nuts, the nuts being provided with cooperating threads. The bolt is provided with a tool grip which is weakened at its juncture with the bolt whereby as the bolt is screwed home and the plate drawn firmly against the bracket, the head is broken off, leaving the bolt in an inaccessible position within the nuts, thereby preventing its removal without destruction of the plate.

A device embodying features of my invention is illustrated in the accompanying drawing, forming a part of this application, in which Fig. 1 is a fragmentary front elevation showing a motor vehicle license plate secured in place in accordance with my invention, certain parts being broken away;

Fig. 2 is a sectional view taken along the line II—II of Fig. 1;

Fig. 3 is a disassembled view similar to Fig. 2, showing the method of applying the fastening means;

Figs. 4 and 5 are side and plan views respectively of the rear fastening nut employed with my improved fastening means;

Figs. 6 and 7 are side and plan views respectively of the front fastening nut;

Figs. 8 and 9 are side and plan views of the bolt employed with my improved fastening means; and Fig. 10 is a sectional view showing a modified form of recess provided in the identifying plate.

Referring now to the drawing for a better understanding of my invention, I show a plate 10 secured to a relatively fixed bracket 11. The bracket 11, as is usual, is provided with elongated slots 12 through which securing bolts are adapted to pass. Although two elongated slots 12 are shown, it will be obvious that a single slot of sufficient length may be employed.

The plate 10 is provided on its front side with a plurality of rectangular or other suitable polygonal recesses 13, into each of which is adapted to fit a front securing nut 14. Only two of these recesses 13 are shown in Fig. 1 of the drawing, located near the upper edge of the plate 10. It will be understood, however, that more than two may be provided and located in any suitable part of the plate for convenience in attaching the plate to the vehicle. The recess 13, as shown in Figs. 2 and 3, may be formed by pressing the metal plate so as to provide a ridge 16 extending about the confines of the recess, or it may be formed as shown in Fig. 10, by pressing a depression 17 in the face of the plate, into which depression the nut 14 is adapted to fit snugly. The nut 14, as shown in the drawing, is provided with a threaded bore 18, the threads being left hand threads. As shown, the threaded portion of the bore 18 preferably terminates short of the outer side of the nut 14 and is provided at its outer end with an overhanging lip 19. Centrally of each of the recesses 13 is a bolt hole 15.

At the rear of the bracket 11 is provided a fastening nut 21 having a bore 22 provided with right hand threads. As shown in the drawing the bore 22 preferably terminates short of the outer wall of the nut, whereby it is entirely covered. The nut 21, as may be seen in Figs. 4 and 5, is provided with lugs 23 and 24 adapted to fit in the elongated recess 12 in the bracket 11 so as to prevent the nut from turning relative to the bracket.

Cooperating with the nuts 14 and 21 is a bolt 26 having one end portion 27 provided with right hand threads to cooperate with the nut 21 and the other end portion 28 having left hand threads adapted to cooperate with the nut 14. The central portion 29 is reduced somewhat for a purpose to be described presently. The bolt 26 is provided with a tool grip 31, the greatest width of which is less than the diameter of the outer open end of the nut 14 and which is adapted to be grasped by a wrench or a pair of pliers in screwing the bolt into the nuts 14 and 21. At its juncture 32 with the threaded portion of the bolt 26, it is weakened so that the tool grip 31 may be twisted off when tightening the nuts 14 and 21.

My improved fastening means is applied as shown in Fig. 3 of the drawing. The nut 14 is first placed on the bolt 26 and turned with the fingers one turn of the threads. The bolt is then passed through the plate 10 and slot 12 in the bracket 11, and the nut 14 seated in the recess 13. The nut 21 is then applied one turn of the threads with the fingers. The tool grip 31 of the bolt 26 is then grasped with a suitable tool and the bolt turned to tighten both nuts, and at the same time the lugs 23 and 24 on the nut 21 are seated in the slot 12.

As shown in Fig. 2 of the drawing, the threaded portions 27 and 28 of the bolt 26 are slightly less in length than the depth of the threaded bores 18 and 22 of the nuts 14 and 21. This difference in extent, together with the reduced portion 29 of the bolt 26, insures that the nuts may be drawn up tight on the bolt without engaging the bottoms of the recesses 18 and 22, and without the nut with the left hand threads engaging with the right hand threaded portion of the bolt 26, and vice versa. As the bolt 26 is screwed up tight in the nuts 14 and 21, the head 31 is twisted off within the bore 18. The portion 28 of the bolt 26 is then protected against access by the overhanging lip 19 of the nut 14, and the end 27 of the bolt 26 can not be reached by reason of the fact that the recess 22 is closed at its outer end.

There being more than one bolt to hold the plate in place, as shown in Fig. 1, it will be obvious that, once installed, the plate can not be removed without its mutilation to such an extent that the nut 14 can be turned to unscrew it from the bolt 26. This may be accomplished only by cutting or mutilating the sides of the recess and otherwise defacing the plate. In order to facilitate removal of the plate by mutilating it, I may provide a weakened line 33 extending diagonally across the corner of the plate, through the bolt hole 15, as indicated by the dotted lines in Fig. 1. These weakened lines may be formed by scoring or otherwise weakening the plate in its manufacture. With such a provision the plate may be grasped at the corners with a pair of pliers and torn across, whereupon the separate corner portions of the plate may be pulled away and the main body portion of the plate pried from the underside of the nuts 14. The latter may then be readily removed from the bolts 26.

From the foregoing it will be apparent that I have devised an improved fastening means for securing identifying metallic plates to relatively fixed brackets, which is effective, when once installed, to prevent the removal of a plate without its mutilation or destruction.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In combination, an identifying metallic plate, a mounting bracket having an opening therein, opposed nuts in combination with a reversely threaded bolt passing through the opening in the bracket and being adapted for threaded engagement with said nuts and having a weakened tool grip adapted to project without one of said nuts with its weakened portion disposed substantially within the bore of said nut when in service position, means to engage the nut adjacent the bracket and hold it against rotation when in service position, said plate having an aperture for the passage of said bolt and associated means to prevent the rotation of the adjacent nut when in service position.

2. In combination, an identifying metallic plate, a bracket having a plurality of elongated slots therein, a plurality of bolts having reversely threaded end portions extending through the plate and the slots in the bracket, a nut having a bore therein closed at its outer end and threaded to screw on to one end of each of the bolts, a second nut having a bore therein with an overhanging lip at its outer end and threaded to screw on to the other end of each of the bolts, a tool grip on one end of each of the bolts adapted to extend through the bore of said second nut, said tool grip being weakened at its juncture with the bolt for breakage within the bore of the second nut when in service position, and means to hold both nuts against rotation on the bolt when in service position.

3. In combination, an identifying metallic plate, a relatively stationary element having an elongated slot therein, said plate having a plurality of polygonal depressions formed therein with a bolt hole in each of the depressions, a bolt extending through each of the bolt holes and the slot in the bracket, right hand threads on one end portion of each bolt and left hand threads on the other, a nut on one end of each bolt with cooperating threads and bearing against the bracket, lugs on the nut fitting into the slot in the bracket, a nut with cooperating threads on the other end of each bolt and adapted to fit and seat within said depression, and a tool grip end on each bolt weakened for breakage from the bolt within the bore of the adjacent nut.

4. A means for securing identifying metallic plates to relatively fixed brackets having elongated slots therein comprising a bolt provided on its opposite end portions with right and left hand threads respectively, nuts having threaded bores adapted to cooperate with the opposite ends of the bolt, and a tool grip on the bolt weakened at its juncture with the bolt whereby it is adapted to be twisted off in the bore of one of the nuts when tightening the nuts on the bolt.

5. The combination with a fixed bracket having a plurality of elongated slots therein for securing a metallic plate thereto, of a metallic plate adapted to be secured to the bracket and having bolt holes therein spaced to register with the slots in the bracket, a bolt having reversely threaded end portions passing through each of the bolt holes and the slots in the bracket, a nut on one end of each of the bolts and bearing against the plate, means on the plate to hold the nut against turning, another nut on the other end of each of the bolts, means on the other nut cooperating with the bracket to hold it against turning on the bolt, and a tool grip on each bolt weakened at its juncture with the bolt for breakage in the bore of one of the nuts.

6. The combination with a fixed bracket having a plurality of elongated slots therein for securing a metallic plate thereto, of a metallic plate adapted to be secured to the bracket and having bolt holes therein spaced to register with the slots in the bracket, there being polygonal recesses in the plate surrounding each of the bolt holes, a bolt having reversely threaded end portions passing through each of the bolt holes and the slots in the bracket, nuts provided with threads to cooperate with the bolts, a nut on one end of each of the bolts being shaped to fit the polygonal recesses and be held thereby against turning, a nut on the other end of each of the bolts, means on the other nut cooperating with the bracket to hold it against turning on the bolt, and a tool grip on each bolt weakened at its juncture with the bolt for breakage in the bore of one of the nuts.

7. The combination with a fixed bracket having a plurality of elongated slots therein for securing a metallic plate thereto, of a metallic plate adapted to be secured to the bracket and having a pair of bolt holes therein located near opposed corners on one side of the plate and spaced to register with the slots in the bracket, the plate being weakened along diagonal lines at the corners across the bolt holes, and being provided with polygonal recesses therein surrounding each of the bolt holes, a bolt having reversely threaded end portions passing through each of the bolt holes and the slots in the bracket, a nut on one end of each of the bolts shaped to fit snugly in each of the polygonal recesses and be held thereby against turning, a nut on the other end of each of the bolts, means on the other nut cooperating with the bracket to hold it against turning on the bolt, and a tool grip on each bolt weakened at its juncture with the bolt for breakage in the bore of one of the nuts.

8. The combination with a fixed bracket having a plurality of elongated slots therein for securing a metallic plate thereto, of a metallic plate adapted to be secured to the bracket and having bolt holes therein spaced to register with the slots in the bracket, a bolt having reversely threaded end portions passing through each of the bolt holes and the slots in the bracket, a nut on one end of each of the bolts having a threaded bore terminating in an overhanging lip at its outer end and adapted to bear against the metallic plate, means on the plate to hold said nut against turning on the bolt when in service position, a nut on the other end of each of the bolts having a threaded bore closed at its outer end, means on the other nut cooperating with the bracket to hold it against turning on the bolt, and a tool grip on each bolt extending through the bore of the first mentioned nut and weakened at its juncture with the bolt for breakage in the bore of said nut when the nut is tightened on the bolt.

DEWEY M. McCAIN.